(12) United States Patent
Pettit et al.

(10) Patent No.: US 7,261,749 B2
(45) Date of Patent: Aug. 28, 2007

(54) MULTI-PORT AUTOTHERMAL REFORMER

(75) Inventors: William H Pettit, Rochester, NY (US); Mohammed E. H. Sennoun, Rochester, NY (US); Gerald E Voecks, Fairport, NY (US)

(73) Assignee: General Motors Corporation, Detroit, MI (US)

( * ) Notice: Subject to any disclaimer, the term of this patent is extended or adjusted under 35 U.S.C. 154(b) by 890 days.

(21) Appl. No.: 10/235,419

(22) Filed: Sep. 5, 2002

(65) Prior Publication Data

US 2004/0047777 A1    Mar. 11, 2004

(51) Int. Cl.
*B01J 8/00* (2006.01)
*C10J 3/00* (2006.01)

(52) U.S. Cl. .................. 48/127.7; 48/127.9; 48/61; 48/107; 48/63; 48/212; 422/190; 422/211; 422/220

(58) Field of Classification Search ............ 422/109, 422/174–178, 190–211, 218–222; 429/13–26; 48/61–63, 107–129, 197–212; 252/372, 252/373, 650–654; 431/4–10, 111–116; 423/648–651; 518/703–707
See application file for complete search history.

(56) References Cited

U.S. PATENT DOCUMENTS

| | | | |
|---|---|---|---|
| 3,954,423 A | 5/1976 | Hamper et al. ............... 48/107 |
| 4,293,315 A | 10/1981 | Sederquist ..................... 48/94 |
| 4,381,187 A | 4/1983 | Sederquist ................... 48/212 |
| 4,587,809 A * | 5/1986 | Ohmori et al. ............... 60/737 |
| 4,642,272 A | 2/1987 | Sederquist ................... 429/17 |
| 4,650,727 A | 3/1987 | Vanderborgh et al. ........ 429/19 |
| 4,659,634 A | 4/1987 | Struthers ..................... 429/19 |
| 4,670,359 A | 6/1987 | Beshty et al. ................ 429/17 |
| 4,816,353 A | 3/1989 | Wertheim et al. ............. 429/19 |
| 4,938,685 A | 7/1990 | Noakes et al. ................. 431/4 |
| 5,143,647 A | 9/1992 | Say et al. .................... 252/373 |
| 5,271,916 A | 12/1993 | Vanderborgh et al. ...... 423/246 |
| 5,484,577 A | 1/1996 | Buswell et al. ............. 422/211 |
| 5,741,474 A | 4/1998 | Isomura et al. .......... 423/648.1 |
| 6,083,425 A | 7/2000 | Clawson et al. ............ 252/372 |
| 6,201,029 B1 * | 3/2001 | Waycuilis .................... 518/703 |
| 6,254,807 B1 | 7/2001 | Schmidt et al. ............. 252/373 |
| 6,268,075 B1 | 7/2001 | Autenrieth et al. ........... 429/17 |
| 6,294,149 B1 | 9/2001 | Autenrieth et al. ...... 423/648.1 |
| 6,383,468 B1 | 5/2002 | Schussler et al. ........... 423/651 |
| 6,541,142 B1 * | 4/2003 | Yu et al. ....................... 429/17 |

FOREIGN PATENT DOCUMENTS

WO    WO98/08771    3/1998

OTHER PUBLICATIONS

PCT/US03/27578 International Search Report mailed Apr. 22, 2004.
Hall et al., "A Porous Media Burner for Reforming Methanol for Fuel Cell Powered Electric Vehicles," SAE Paper #950095, Feb. 27-Mar. 1995.
Natural Gas Power Plant System (a descriptive drawing).

* cited by examiner

*Primary Examiner*—N. Bhat
(74) *Attorney, Agent, or Firm*—Harness, Dickey & Pierce, P.L.C.

(57) ABSTRACT

An autothermal reformer is provided for a fuel cell system utilizing one volume and a plurality of inlets for both start-up and normal operation. In start-up mode, thermal combustion is employed for heating the catalyst reformation section of the reformer. Two inlets are used to feed air and fuel into the system, which are mixed and ignited in the common volume. Once the catalyst has reached light-off temperature, a second set of inlets provide air, steam and fuel into the common volume. The mixture then passes into the catalytic reformation system.

17 Claims, 6 Drawing Sheets

MULTI-PORT AUTOTHERMAL REFORMER

FIELD OF THE INVENTION

The present invention relates generally to a fuel cell system utilizing one volume for the operation of a fuel reformer. In particular, the present invention relates to an autothermal reformer having a thermal Partial oxidation (POX) and a catalytic autothermal reformer which are fed by the same volume using multiple inlet ports.

BACKGROUND OF THE INVENTION $H_2$—$O_2$ (air) fuel cells are well known in the art and have been proposed as a power source for many applications. There are several different types of $H_2$—$O_2$ fuel cells including acid-type, alkaline type, molten-carbonate-type and solid oxide type. So-called PEM (proton exchange membrane) fuel cells [a.k.a. SPE (solid polymer electrolyte) fuel cells] are of the acid-type, potentially have high power and low weight, and accordingly are desirable for mobile applications such as electric vehicles. PEM fuel cells are well known in the art, and include a "membrane electrode assembly" or MEA comprising a thin, proton transmissive, solid polymer membrane-electrolyte having an anode on one of its faces and a cathode on the opposite face. A plurality of individual cells are commonly bundled together to form a PEM fuel cell stack.

In PEM fuel cells hydrogen is the anode reactant or fuel and oxygen is the cathode reactant or oxidant. The oxygen can either be in a pure form as $O_2$ or air as $O_2$ admixed with $N_2$.

For vehicular applications, it is desirable to use a liquid fuel such as a low molecular weight alcohol (e.g. methanol or ethanol), or hydrocarbons (e.g. gasoline) as the fuel for the vehicle owing to the case of on board storage of liquid fuels and the existence of a nationwide infrastructure for supplying liquid fuels. However, such fuels must undergo chemical conversion processes to release the hydrogen content thereof for fueling the fuel cell. The initial process is accomplished in a reformer that provides thermal energy as needed to catalyst mass and yields a reformate gas comprising primarily hydrogen, carbon monoxide, and carbon dioxide.

The heat required to produce hydrogen varies with the electrical demand put on the fuel cell system at any given point in time. Accordingly, the heating source for the reformer must be capable of operating over a wide range of heat outputs. Heating the reformers with heat generated from either a flame combustor or a catalytic combustor is known. The present invention relates to an improved flame combustor intake system, and the integration thereof with a fuel cell system in which a single given volume is utilized to perform two different operations, one during start-up and the other during normal operation.

The acceptance of fuel cells by vehicle owners will be governed, in part, by their experience with vehicles powered by internal combustion engines. Consumers have grown accustomed to the relatively quick starting times of engines. Thus, one challenge facing fuel cell designers is to provide a similar relatively quick start up time for fuel cells. This is made difficult by the relatively high operating temperature of some of the components within fuel cells such as the primary reactor within the fuel processor.

In order to reduce the start up time required to heat the catalyst to its light off temperature (between 150° C. to 250° C.), it is known to use a thermal combustor. Unfortunately, such thermal combustor systems require a separate chamber for the combustion reaction, increasing the mass, cost and size of the fuel cell system.

Accordingly, a need exists in the art of fuel cells to develop a low-cost thermal combustor system for preheating the catalyst in an autothermal reformer with reduced mass and volume.

SUMMARY OF THE INVENTION

The present invention provides an inlet system for a fuel processor which uses a common volume and multiple inlets for both thermal combustion and catalytic autothermal reforming. The thermal combustor utilizes one set of inlets to quickly heat the catalyst to a light off temperature to prepare it for normal operation. The inlets bring air and fuel into the common volume for thermal combustion. Once the catalyst has been brought to its light off temperature, another set of inlets bring water, air and fuel into the common volume for mixing and distribution through the catalyst. The plurality of inlets allow a single volume to be used for both start-up and normal operation.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

The present invention is generally related to an inlet system for a fuel processor of a fuel cell system. In this regard, the invention will be described in the context of a fuel cell system fueled by gasoline. However, it is to be understood that the principles embodied herein are equally applicable to fuel cells fueled by other reformable fuels such as, for example, propane, natural gas, ethanol, or methanol.

Figure 1:
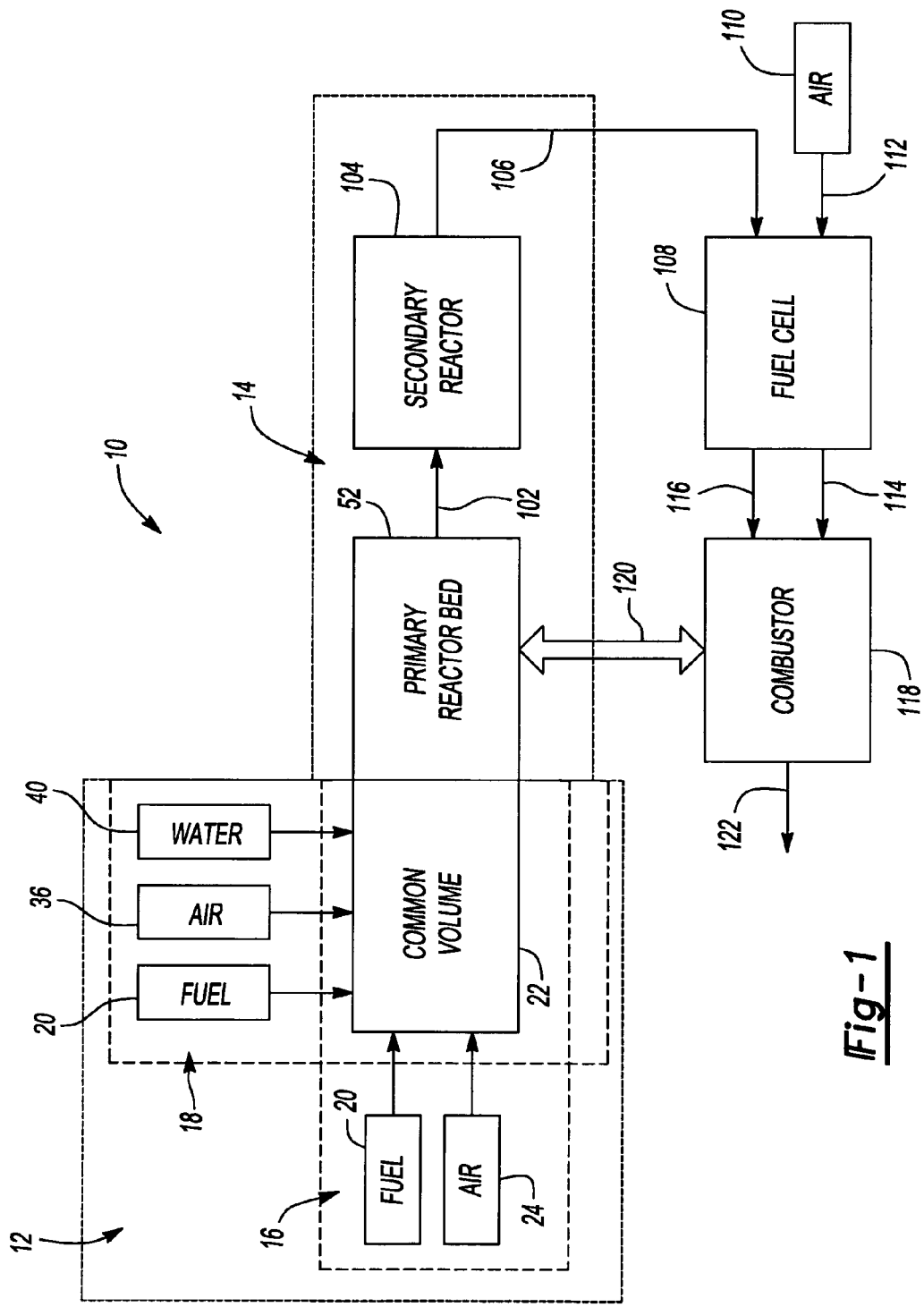
FIG. 1 is a schematic view of a fuel cell system with a multi-port autothermal reformer according to the principles of the present invention.

Referring to FIG. 1, a schematic view of a first embodiment of a multi-port primary reforming reactor 10 such as an autothermal reformer is shown. Autothermal reformer 10 has an inlet system 12 which is in fluid communication with a reforming section 14 via a common volume 22. The inlet system 12 includes a start-up system 16 and a normal operation system 18, both in fluid communication with the common volume 22.

Figure 2:
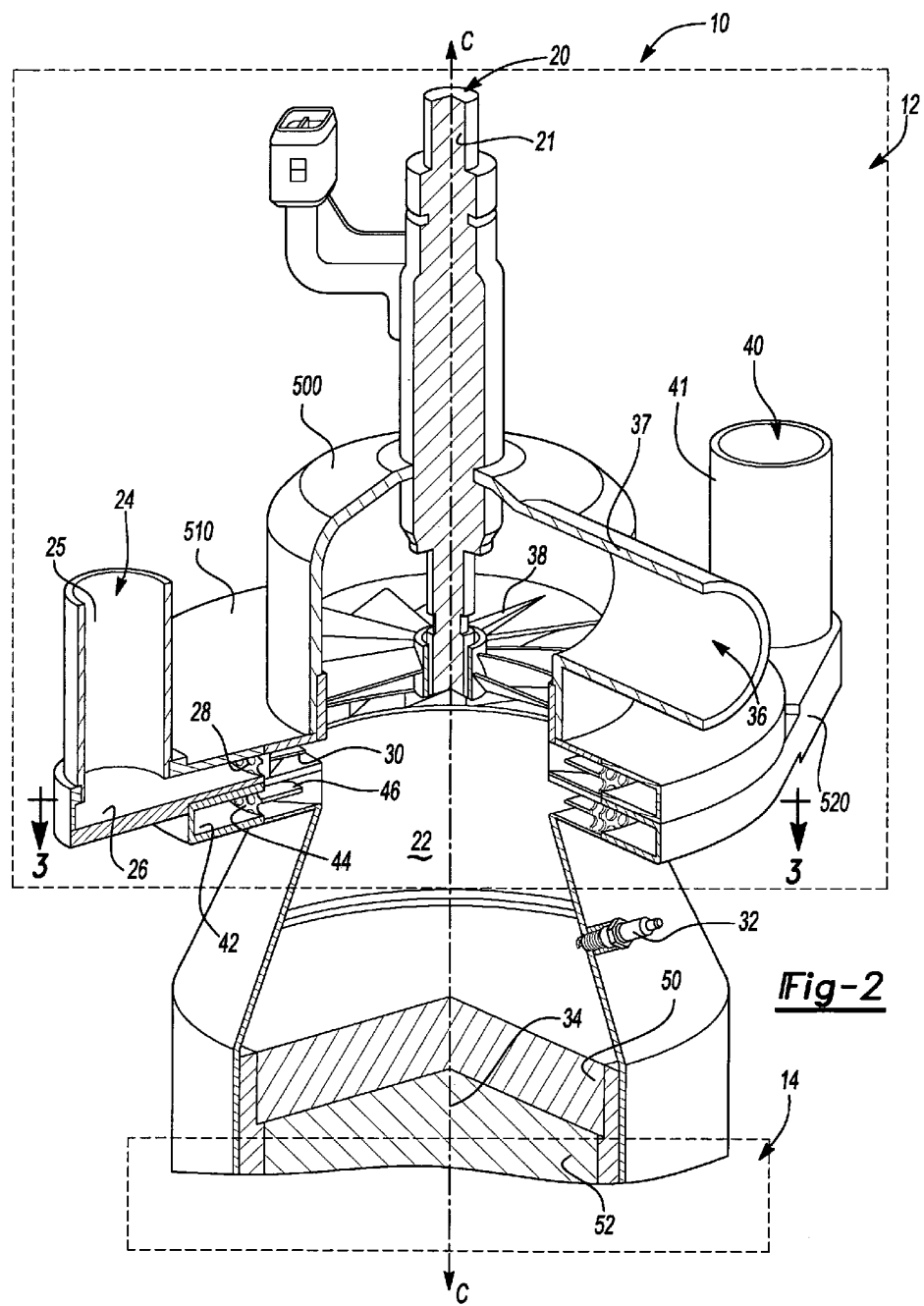
FIG. 2 is a sectional view of an embodiment of a multi-port autothermal reformer according to the principles of the present invention.

With reference now to FIG. 2, a start-up air inlet 24 and a fuel inlet 20, which make-up start-up system 16 of FIG. 1, are both in fluid communication with common volume 22. During start-up operation, fuel and air are provided to the common volume 22 by the start-up air inlet 24 and the fuel inlet 20 where they are mixed and combusted to form a heated exhaust which is passed through the reforming section 14.

Figure 3:
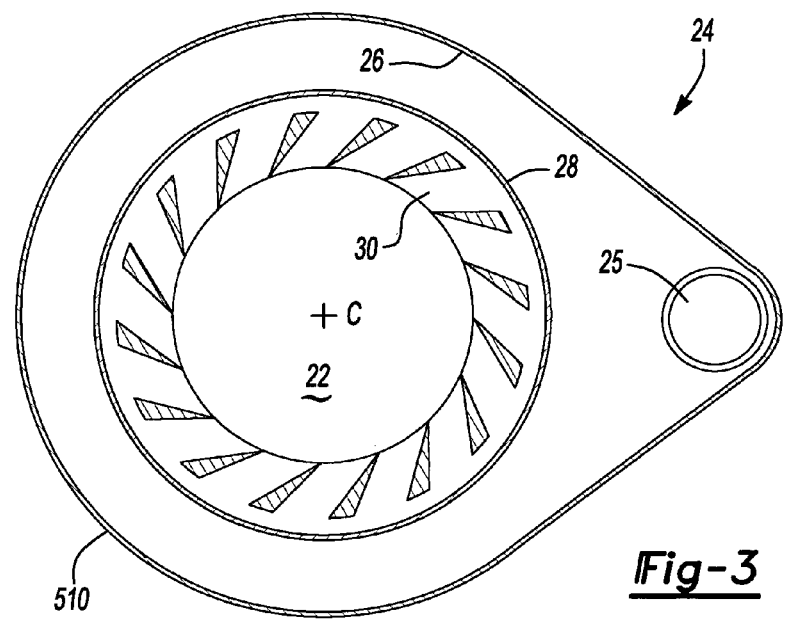
FIG. 3 is a cross sectional view of the tangential swirler taken along line 3-3 of FIG. 2.

Air enters the start-up system 16 through start-up air inlet 24. The start-up air inlet 24 includes a port 25 defined in a housing 510, as best shown in FIG. 3. Port 25 is in fluid communication with an annular volume 26. Annular volume 26 is defined in housing 510 and is in fluid communication with a porous material 28 through which air from annular volume 26 flows. Porous material 28 is disposed within the annular volume 26, radially inward from port 25. The porous material 28 could be, for example, a perforated plate or sintered metal, and acts to place a slight restriction on the flow in the annular volume 26, to ensure uniform distribution. The porous material 28 is in further fluid communication with a swirler or vanes 30. Air from porous material 28 passes through swirler 30, which is defined within housing 510, radially inward of porous material 28 and symmetric with respect to centerline C. Swirler 30 is in fluid communication with the common volume 22 and is utilized to induce a desired flat tangential velocity profile for the air before the air enters common volume 22. The illustrated configuration of the swirler 30 is only an example of many possible swirler configurations. Alternatively, radial injection ports could be used to establish the desired tangential velocity profile.

Referring back to FIG. 2, the fuel inlet 20 introduces fuel into the start-up system 16. The fuel inlet 20 includes a fuel metering device 21 in fluid communication with the common volume 22 in order to transmit fuel into the common volume 22. The fuel metering device 21 is defined in a housing 500 along the centerline C. The fuel metering device 21 is preferably an automotive fuel injector with pulsed flow (5-200 msec pulse width), but could also be a fixed orifice with upstream metering, a fixed orifice with solenoid shut-off or a continuous flow variable orifice.

The fuel inlet 20 is also utilized by the normal operating system 18 shown in FIG. 1. However, in the normal operating system 18, steam enters through steam inlet 40 and air enters through run air inlet 36. During normal operation, fuel, air and steam are thoroughly mixed in the common volume 22 and then passed to the reforming section 14.

As shown in FIG. 2, steam enters the normal operation system 18 via steam inlet 40. The steam inlet 40 includes port 41, annular volume 42, porous material 44 and swirler 46. Port 41 is defined in a housing 520 and is in fluid communication with annular volume 42 which receives the steam from port 41. Annular volume 42 is also defined in housing 520. A porous material 44 is in fluid communication with the annular volume 42 and steam from annular volume 42 passes through the porous material 44. The porous material 44 is disposed in annular volume 42, radially inward from port 41. The porous material 44 could be, for example, a perforated plate or sintered metal and acts to place a slight restriction on the flow in the annular volume 42 to ensure uniform distribution. Porous material 44 is also in fluid communication with a swirler 46 through which steam from the porous material 44 flows. Swirler 46 is located within housing 520, symmetric to centerline C. Swirler 46 is in fluid communication with common volume 22 and is utilized to induce a flat tangential velocity profile to the steam before the steam enters common volume 22. The shown swirler configuration 46 is only an example of many possible swirler configurations. Alternatively, radial injection ports could be used to establish the desired tangential velocity profile. Further, the configuration of the swirler 46 is specific to the flows during the normal operation process and the size of the common volume 22.

Run air inlet 36 introduces air to the common volume 22 during normal operation. Run air inlet 36 includes a port 37 in fluid communication with a swirler 38. Port 37 and swirler 38 are defined in a housing 500. Swirler 38 is in fluid communication with common volume 22 and delivers air with a desired tangential velocity profile. The shown radial swirler configuration 38 is only an example of many possible swirler configurations. Alternatively, radial injection ports could be used to establish the desired velocity profile. Further, the configuration of the swirler 38 is specific to the flows during the normal operation process and the size of common volume 22.

The common volume 22 serves as both the mixing volume for normal operation and the site for thermal combustion during start-up operation. Common volume 22 is defined in a conical housing positioned upstream from the reforming section 14. The common volume 22 includes an ignition source 32, heat shield 50, and a temperature sensor 34. The ignition source 32 is utilized during start-up operation only to initiate combustion. Air and fuel mix in the common volume 22 and are ignited via ignition source 32. The ignition source 32 could be, but is not limited to, a spark plug. The heat shield 50 forms the boundary between the common volume 22 and reforming section 14 to control the amount of heat transfer. The heat shield 50 is typically, but not limited to, a porous structure, such as, for example, reticulated foam. Positioned on the heat shield 50 is a temperature sensor 34 which is typical, but not limited to, thermocouple 34. Temperature sensor 34 is in fluid communication with the reforming section 14 and once light-off temperature of the reforming section 14 is achieved, as judged by temperature sensor 34, normal operation commences.

Once the light-off temperature has been reached, as determined by temperature sensor 34, a normal operation air, fuel and steam mixture flows into the reforming section 14 from common volume 22. Referring to FIG. 1, the reforming section 14 is defined in a cylindrical housing and includes a first primary reactor or first catalyst bed 52 and one or more reactors or catalyst beds such as 104. The primary reactor 52 is in fluid communication with the common volume 22 and is upstream from the second reactor 104. The primary reactor 52 serves to generate the hydrogen from the hydrocarbon fuel. The primary reactor 52 is in fluid communication with at least a second reactor 104 for transporting reformate via a channel 102. Second reactor 104 further refines the reformate stream into a hydrogen containing stream. Channel 106 is fluidly connected to the secondary reactor 104. Channel 106 transmits the hydrogen from the secondary reactor 104 to fuel cell 108.

Fuel cell 108 is in fluid communication with the secondary reactor 104, receiving hydrogen via channel 106. Fuel cell 108 includes an air inlet 112, a hydrogen inlet via channel 106, and two outlet ports or channels 114 and 116. Coolant and electrical connections associated with the fuel cell are not depicted. Reformate from the secondary reactor 104 enters fuel cell 108 via channel 106. Air from an air source 110 enters the fuel cell 108 through air inlet 112. In the fuel cell 108, the air and hydrogen undergoes a chemical reaction resulting in the creation of electricity, as is well known in the art. The fuel cell 108 can be in fluid communication with the combustor 118 through channels 114 and 116. Channel 114 transmits air into the combustor 118 and channel 116 transmits unused hydrogen to the combustor 118.

Combustor 118 is in fluid communication with fuel cell 108 via channels 114 and 116 to receive air and hydrogen, respectively. The air and hydrogen are consumed by the combustor 118 producing heat. Outlet 120 can be fluidly coupled in a heat transfer relationship to the fuel processing section 14. Outlet 120 can be integrated into reforming section 14, hence aiding start-up and/or normal operation via combustor heat utilization. Outlet 122 is in fluid communication with an exhaust system (not shown) for the removal of the exhaust gases from the combustor 118.

On vehicle start-up, air and fuel simultaneously enter the autothermal reformer 10 via the start-up system 16 of inlet system 12. Referring to FIG. 2, air enters through port 25 into annular volume 26. The air then passes through porous material 28 before entering swirler 30. The air from swirler 30 flows into common volume 22. Fuel enters via fuel metering device 21 into common volume 22. Air and fuel are then ignited in common volume 22 by ignition source 32.

The heat generated from the combustion is used to warm the reforming section 14. Once thermocouple 34 detects that the reforming section 14 has reached its light-off temperature, normal operation ensues.

In normal operation mode, air is diverted from start-up air inlet 24 to port 37 as illustrated in FIG. 2. The air in port 37 then flows through swirler 38 before entering common volume 22. Steam enters from port 41 and flows into annular volume 42. The steam then passes through porous material 44 and swirler 46 before entering common volume 22. Fuel enters common volume 22 via fuel metering device 21. The air, steam and fuel in common volume 22 mix before passing through the heat shield 50 into the first primary reactor 52. The mixture undergoes a chemical reaction in the primary reactor 52 resulting in the formation of a hydrogen rich reformate stream. The reformate from the primary reactor 52 passes into the secondary reactor 104 (FIG. 1), for further fuel processing and then the reformate from the secondary reactor 104 moves into the fuel cell 108. In the fuel cell 108, the hydrogen rich reformate reacts with air from air inlet 112 and creates useful electrical energy. Next, the air and unused fuel from the fuel cell 108 flow into combustor 118 and are ignited. The heat from the hot combustion gases from combustor 118 can be used to heat the primary reactor bed 52 via outlet 120 to aid in maintaining the primary reactor 52 temperature. These gases then exit the combustor 118 via outlet 122.

Figure 4:
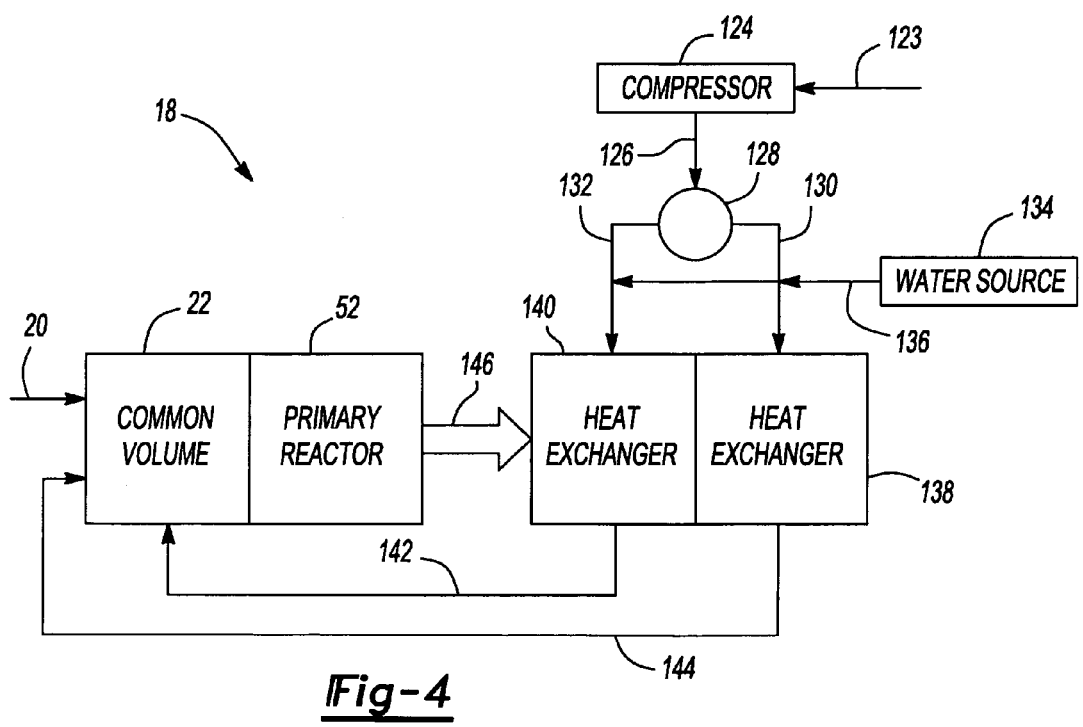
FIG. 4 is a detailed schematic view of the normal operation system of the first embodiment of the present invention.

FIG. 4 is a detailed schematic view of the normal operation system 18 for the embodiment shown in FIG. 1, wherein common reference numbers are utilized therein. In this detailed schematic view, the normal operation system 18 includes a compressor 124, control valve 128, water source 134, primary reactor 52, common volume 22 and heat exchangers 138 and 140.

Compressor 124 receives air from run air inlet 123 and is in fluid communication with control valve 128 via channel 126 to deliver the compressed air. Control valve 128 is controlled by operational feedback. Control valve 128 is in fluid communication with a pair of channels 130 and 132 for the delivery of the compressed air. The proportion of air sent into channels 130 and 132, however, is determined by the results of operational conditions which may include spray quality, steam split, power level, inlet mixture temperature, pressure, steam to carbon ratio, oxygen to carbon ratio and dynamic conditions. Based on the operating conditions, for example, the control valve 128 rations the air split into channels 130 and 132 to induce higher shear if there is a demand for high power in order to minimize the common volume 22 while still completely mixing and distributing the mixture. The operating control valve 128 will also ration the air split to assure velocity vector cancellation or offset, resulting in minimum recirculation at low power to avoid auto ignition and flashback within the common volume 22.

Channels 130 and 132 are in further fluid communication with heat exchangers 138 and 140, respectively and a water source 134. Channel 130 receives water from water source 134 via a channel 136 and transfers the air rationed from the control valve 128 and the water from water source 134 into heat exchanger 138 for heating. Similarly, channel 132 receives water from water source 134 via a channel 136 and transfers the air rationed from the control valve 128 and the water from water source 134 into heat exchanger 140 for heating.

Heat exchangers 138 and 140 are shown in FIG. 4 as two separate units, however, heat exchangers 138 and 140 could be one unit with a flow separation built in. Heat exchangers 138 and 140 heat the air and water using the heat from the reformate stream generated by the primary reactor 52 before the mixture enters common volume 22. Heat exchanger 138 is in fluid communication with common volume 22 via a channel 144, while heat exchanger 140 is in fluid communication with common volume 22 via a channel 142, both providing steam to the common volume 22 of primary reactor 52.

Fuel enters the common volume 22 via an injector 20. Fuel and air blend in the common volume 22 before passing into the primary reactor 52. The primary reactor 52 processes the fuel through a chemical reaction which generates heat. The primary reactor 52 is in a heat transfer relationship with heat exchanger 140 with reformate gases passing through a channel 146, whereby the heat generated from the reaction is used to warm the compressed air and water mixture before it enters the common volume 22.

During normal operation of the system as detailed in FIG. 4, air is compressed by a compressor 124 before entering a control valve 128. The control valve 128 will split the air into two channels 130 and 132 at a ratio based on the fuel cell performance. The rationed air flows through channels 130 and 132 where it is joined by steam, or two-phase water from a water source 134. The air and water mixture from channel 133 enters heat exchanger 138, while the air and water mixture from channel 135 enters heat exchanger 140 and both are warmed by the heat transferred from the reformate gases from the primary reactor 52. The steam from the heat exchangers 138 and 140 is then passed to the common volume 22 by channels 144 and 142 respectfully, where it mixes with fuel from fuel metering device 21. The mixture of steam and fuel then flows into the primary reactor 52 wherein a chemical reaction occurs. The primary reactor 52 is in a heat transfer relationship with heat exchanger 140 via channel 146. The heat produced by the chemical reaction transferred via channel 146 is used to heat the incoming air and water mixture in heat exchangers 138 and 140 before they reach the common volume 22.

Figure 5:
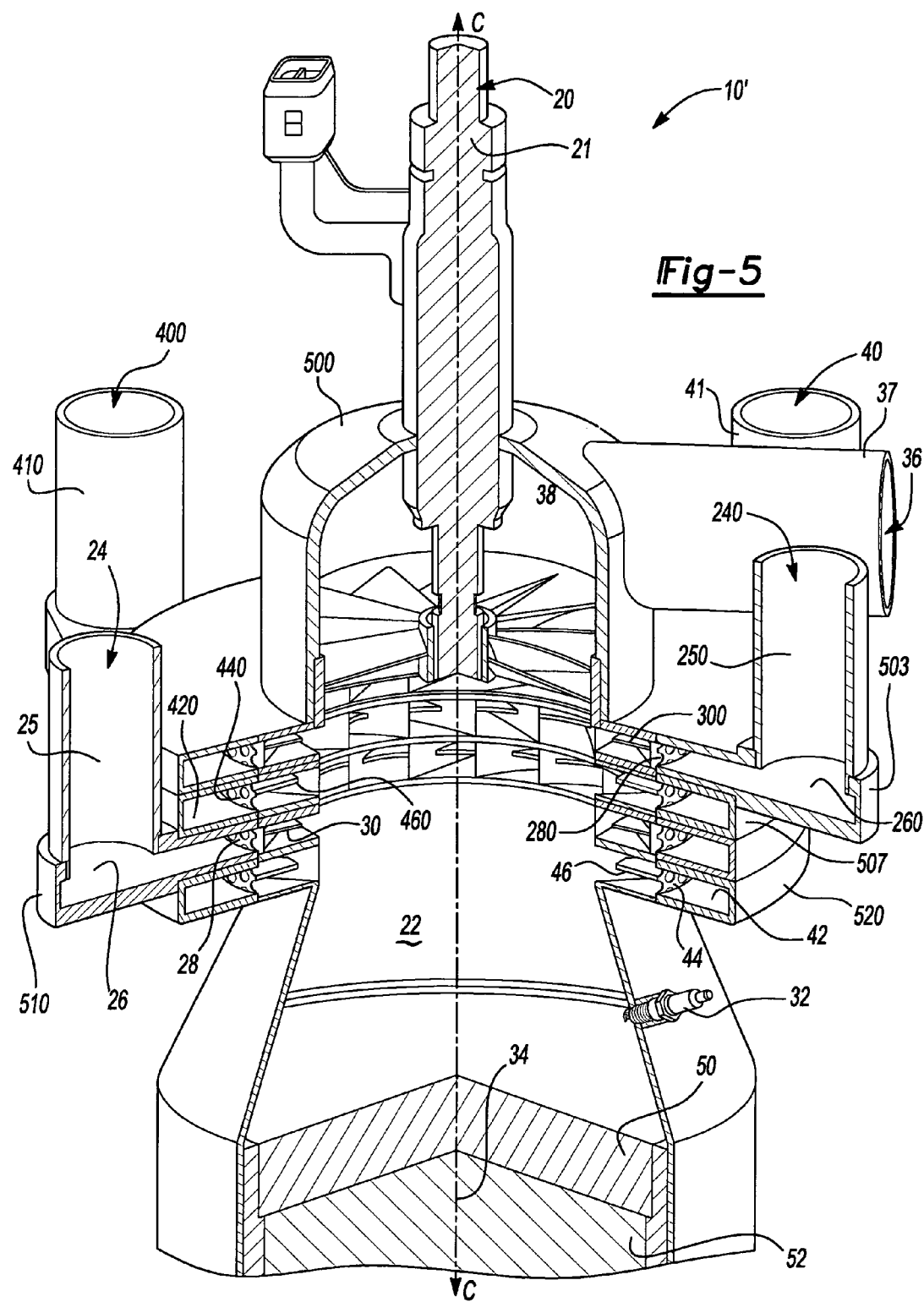
FIG. 5 is a sectional view of a multi-port inlet autothermal reformer according to an alternative embodiment of the present invention.

An alternative embodiment for an autothermal reformer 10' is shown in FIG. 5, wherein common reference numbers are utilized herein. The autothermal reformer 10' is based on the previous embodiment, including the reforming section 14 and the inlet system 12, wherein inlet system 12 contains both the start up system 16 and the normal operation system 18 as shown in FIG. 1. The difference between this embodiment and the embodiment disclosed in FIG. 2 is the inlet system 12, which will be described in detail below.

The second embodiment 10' includes start-up air inlet 24 as described previously. In addition, start-up air inlet 240, together with the fuel inlet 20 are in fluid communication with the common volume 22 which make up the start-up system 16 of the inlet system 12 of FIG. 1. The difference between this second embodiment and the embodiment disclosed in FIGS. 1-3 is the additional start-up air inlet 240. During start-up operation, fuel and air are provided to the common volume 22 where they are mixed and combusted to form a heated exhaust which is passed through the reforming section 14.

Air enters the start-up system 16 through both first start-up inlet 24 and second start-up air inlet 240. The start-up air inlet 240 includes a port 250 defined in a housing 503. Port 250 is in fluid communication with an annular volume 260. Annular volume 260 is defined in housing 503 and is in fluid communication with a porous material 280 through which air from annular volume 260 flows. Porous material 280 is disposed within the annular volume 260, radially inward from port 250. The porous material 280 could be, for example, a perforated plate or sintered metal, and acts to place a slight restriction on the flow in the annular volume 260, to ensure uniform distribution. The porous material 280 is in further fluid communication with a swirler or vanes 300. Air from porous material 280 passes through swirler 300, which is defined within housing 503, radially inward of porous material 280 and symmetric with respect to centerline C. Swirler 300 is in fluid communication with the common volume 22 and is utilized to induce a desired flat tangential velocity profile for the air before the air enters common volume 22. The shown swirler configuration 300 is only an example of many possible swirler configurations. Alternatively, radial injection ports could be used to establish the desired tangential velocity profile. Further, the configuration of the swirler 300 is specific to the flows during the start up process and to the size of the common volume 22.

In the embodiment described in FIGS. 1-3, the fuel inlet 20 was also utilized by the normal operating system 18. In this embodiment, however, the fuel inlet 20 used with the start-up system is not used for normal operation. Specifically, in this embodiment, air enters through run air inlet 36, start-up air inlet 24, start-up air inlet 240 and fuel and steam enter through inlets 40 and 400. During normal operation, fuel, air and steam are thoroughly mixed in the common volume 22 and then passed to the reforming section 14.

Fuel and steam are preheated in a heat exchanger or by a tailgas combustor (not shown) and enter the normal operating system 18 via steam and fuel inlets 40 and 400. Steam and fuel inlet 40 includes port 41, annular volume 42, porous material 44 and swirler 46. Port 41 is defined in a housing 520 and is in fluid communication with annular volume 42 which receives the steam and fuel mixture from port 41. Annular volume 42 is also defined in housing 520. A porous material 44 is in fluid communication with the annular volume 42 and the steam and fuel mixture from annular volume 42 passes through the porous material 44. The porous material 44 is disposed in annular volume 42, radially inward from port 41. The porous material 44 could be, for example, a perforated plate or sintered metal and acts to place a slight restriction on the flow in the annular volume 42 to ensure uniform distribution. Porous material 44 is also in fluid communication with a swirler 46 through which the steam and fuel mixture from the porous material 44 flows. Swirler 46 is located within housing 520, symmetric to centerline C. Swirler 46 is in fluid communication with common volume 22 and is utilized to induce a flat tangential velocity profile to the steam and fuel mixture before the steam and fuel enter common volume 22. The shown swirler configuration 46 is only an example of many possible swirler configurations. Alternatively, radial injection ports could be used to establish the desired tangential velocity profile. Further, configuration of swirler 46 is specific to the flows during the normal operation process and the size of the common volume 22.

Steam and fuel inlet 400 includes port 410, annular volume 420, porous material 440 and swirler 460. Port 410 is defined in a housing 507 and is in fluid communication with annular volume 420 which receives the steam and fuel mixture from port 410. Annular volume 420 is also defined in housing 507. A porous material 440 is in fluid communication with the annular volume 420 and the steam and fuel mixture from annular volume 420 passes through the porous material 440. The porous material 440 is disposed in annular volume 420, radially inward from port 410. The porous material 440 could be, for example, a perforated plate or sintered metal and acts to place a slight restriction on the flow in the annular volume 420 to ensure uniform distribution. Porous material 440 is also in fluid communication with a swirler 460 through which the steam and fuel mixture from the porous material 440 flows. Swirler 460 is located within housing 507, symmetric to centerline C. Swirler 460 is in fluid communication with common volume 22 and is utilized to induce a flat tangential velocity profile to the steam and fuel mixture before the steam and fuel enter common volume 22. The shown swirler configuration 460 is only an example of many possible swirler configurations. Alternatively, radial injection ports could be used to establish the desired tangential velocity profile. Further, the configuration of swirler 460 is specific to the flows during the normal operation process and the size of the common volume 22.

Air is introduced during normal operation by the run air inlet 36 as described in the previous embodiment, as well as the start-up air inlets 24 and 240. In this embodiment, multiple air inlets, 36, 24 and 240, are used during normal operation to generate shear within the flows to induce mixing in short residence times as well as introducing velocity vector cancellation or offset, to minimize recirculation typically generated by radial and tangential inputs.

During vehicle start-up, air and fuel simultaneously enter the autothermal reformer 10' via inlet system 12. Air enters through ports 25 and 250 and passes into annular volumes 26 and 260 respectively. The air then passes through porous material 28 and 280 before entering swirlers 30 and 300 respectively. The air from swirlers 30 and 300 flows into common volume 22. Fuel enters via fuel metering device 21 into common volume 22. Air and fuel are then ignited in common volume 22 by ignition source 32.

The heat generated from the combustion is used to warm the reforming section 14. Once thermal sensor 34 detects that the reforming section 14 has reached its light-off temperature, normal operation ensues.

In the normal operation mode, air enters the autothermal reformer 10' via start-up air inlets 24, 240 and run air inlet 36. The air entering ports 25 and 250 traverses the same flow path as in start-up operation. Air flows from port 37 through swirler 38 before entering common volume 22. Steam and fuel enter via ports 41 and 410. Steam and fuel in port 41 pass through annular volume 42 and a porous material 44 before entering swirler 46. The fuel and steam mixture from swirler 46 then flows into common volume 22. Likewise, the steam and fuel mixture entering port 410 flows into an annular volume 420. Next, the steam and fuel mixture flows through a porous material 440 before entering swirler 460. The fuel and steam mixture exit from swirler 460 and enters the common volume 22. The air, steam and fuel in common volume 22 mix before passing through the heat shield 50 into the first primary reactor 52.

The advantage to this embodiment is the use of the start-up air inlets 24 and 240 with the steam and fuel inlets 40 and 400. Particularly, if the steam and fuel swirlers, 46 and 460, are tangential and in the same rotational direction as the air swirlers 30 and 300 or in a counter-rotational direction, a reduction in the mixing time and distribution volume needed will occur, resulting in lower residence times at lower flows. The reduction in residence time at lower flows results in a wider operational range or turndown.

Figure 6:
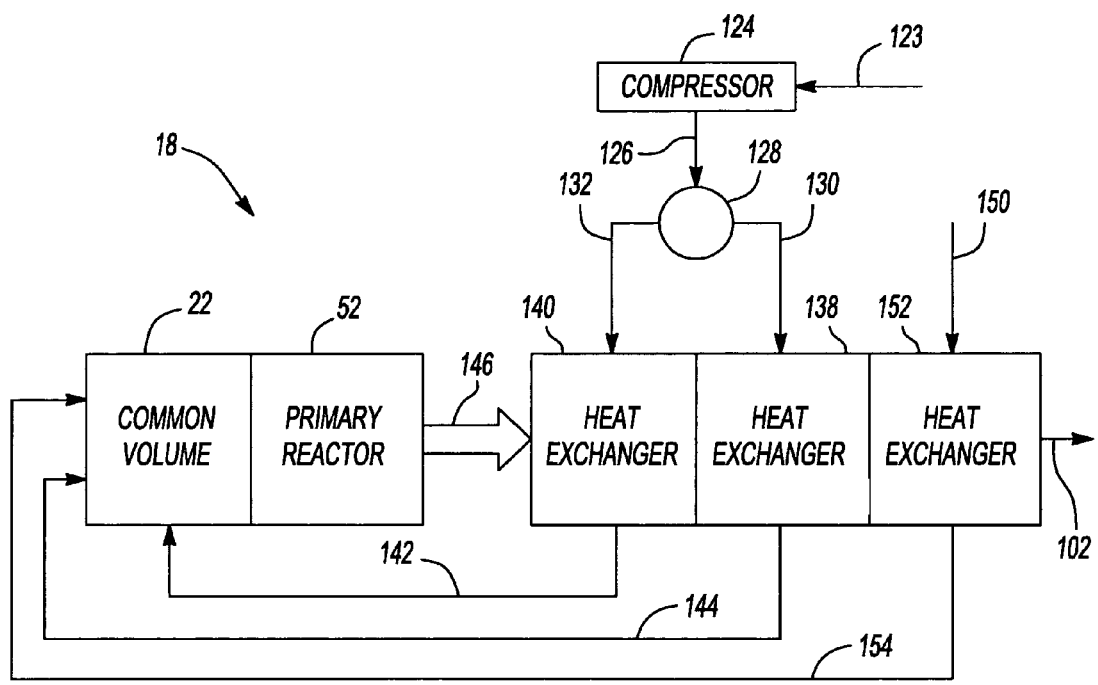
FIG. 6 is a schematic view of the fuel processor system utilizing the multi-port inlet autothermal reformer according to the second embodiment of the present invention during normal operation.

FIG. 6 is a detailed schematic of the normal operating system 18 for the embodiment shown in FIG. 5, wherein common reference numbers are utilized herein. In this detailed schematic, the normal operating system 18 includes a compressor 124, control valve 128, primary reactor 52, common volume 22 and heat exchangers 138,140 and 152.

Compressor 124 receives air from inlet 123 and is in fluid communication with control valve 128 via a channel 126. Control valve 128 is controlled by operational feedback. Control valve 128 is in fluid communication with a pair of channels 130 and 132 for the delivery of the compressed air. The proportion of air sent into channels 130 and 132, however, is determined by the results of operational conditions which may include spray quality, steam split, power level, inlet mixture temperature, pressure, steam to carbon ratio, oxygen to carbon ratio, and dynamic conditions. Based on operating conditions, for example, the control valve 128 divides the air sent to channels 130 and 132 to induce higher shear if there is a demand for high power in order to minimize the common volume 22 while completely mixing and distributing the mixture. The operating control valve 128 will also ration the air split to assure velocity vector cancellation or offset, resulting in minimum recirculation at low power to avoid auto ignition and flashback within the common volume 22.

Channels 130 and 132 are in further fluid communication with heat exchangers 138 and 140, respectively. Channel 130 transfers the compressed air rationed from the control valve 128 into heat exchanger 138 for heating. Similarly, channel 132 transfers the compressed air rationed from the control valve 128 into heat exchanger 140 for heating.

Fuel and water enter the normal operation system 18 via port 150. Port 150 is in fluid communication with a heat exchanger 152 for transferring the fuel and water. The fuel and water are heated in heat exchanger 152 to create a mixture of steam and fuel vapor. Heat exchangers 138, 140 and 152 could be one unit with a flow separation built in. Heat exchangers 138, 140 and 152 heat the air, fuel and water from the control valve 128 using the heat from the reformate stream generated by the primary reactor 52.

Heat exchanger 138 is in fluid communication with common volume 22 via a channel 144 for transmitting compressed air into the common volume 22. Heat exchanger 140 is in fluid communication with common volume 22 via a channel 142 to provide the common volume 22 with air. Heat exchanger 152 is in fluid communication with the common volume 22 via a channel 154 for supplying the common volume 22 with fuel and steam. Heat exchanger 152 may or may not follow heat exchanger 138 in the reformate stream.

Fuel, steam and air blend in the common volume 22 before passing into the primary reactor 52. The primary reactor 52 breaks down the hydrocarbons in the fuel through a chemical reaction which can generate heat. The primary reactor 52 is in a heat transfer relationship with heat exchangers 140, 138 and 152 via a channel 146, whereby the heat generated from the reaction is used to warm the compressed air, fuel and water before they enter the common volume 22.

During normal operation of the system as detailed in FIG. 6, air is compressed by a compressor 124 before entering a control valve 128. The control valve 128 will split the compressed air into two channels 130 and 132 at a ratio based on the operational conditions. The rationed air flows through channels 130 and 132. The air from channel 130 enters heat exchanger 138 and is warmed by the heat transferred from the reformate gases from the primary reactor 52. The air from channel 132 enters heat exchanger 140 and is warmed by heat from the reformate gases as well. The air from the heat exchangers 138 and 140 is then passed to the common volume 22 by channels 144 and 142 respectfully.

Fuel and water enter in liquid, two phase, or vapor form via port 150. The fuel and water mixture flows into heat exchanger 152 where it is heated by the reformate gases from primary reactor 52. Then, the fuel and water vapor mixture is passed from the heat exchanger 152 through channel 154 into common volume 22.

The air, fuel and steam mix in common volume 22 before flowing into the primary reactor 52 wherein a chemical reaction occurs. The primary reactor 52 is in a heat transfer relationship with heat exchanger 140 via channel 146. The heat produced by the chemical reaction transferred via channel 146 is used to heat the incoming air, fuel and water before they reach the common volume 22.

Figure 7:
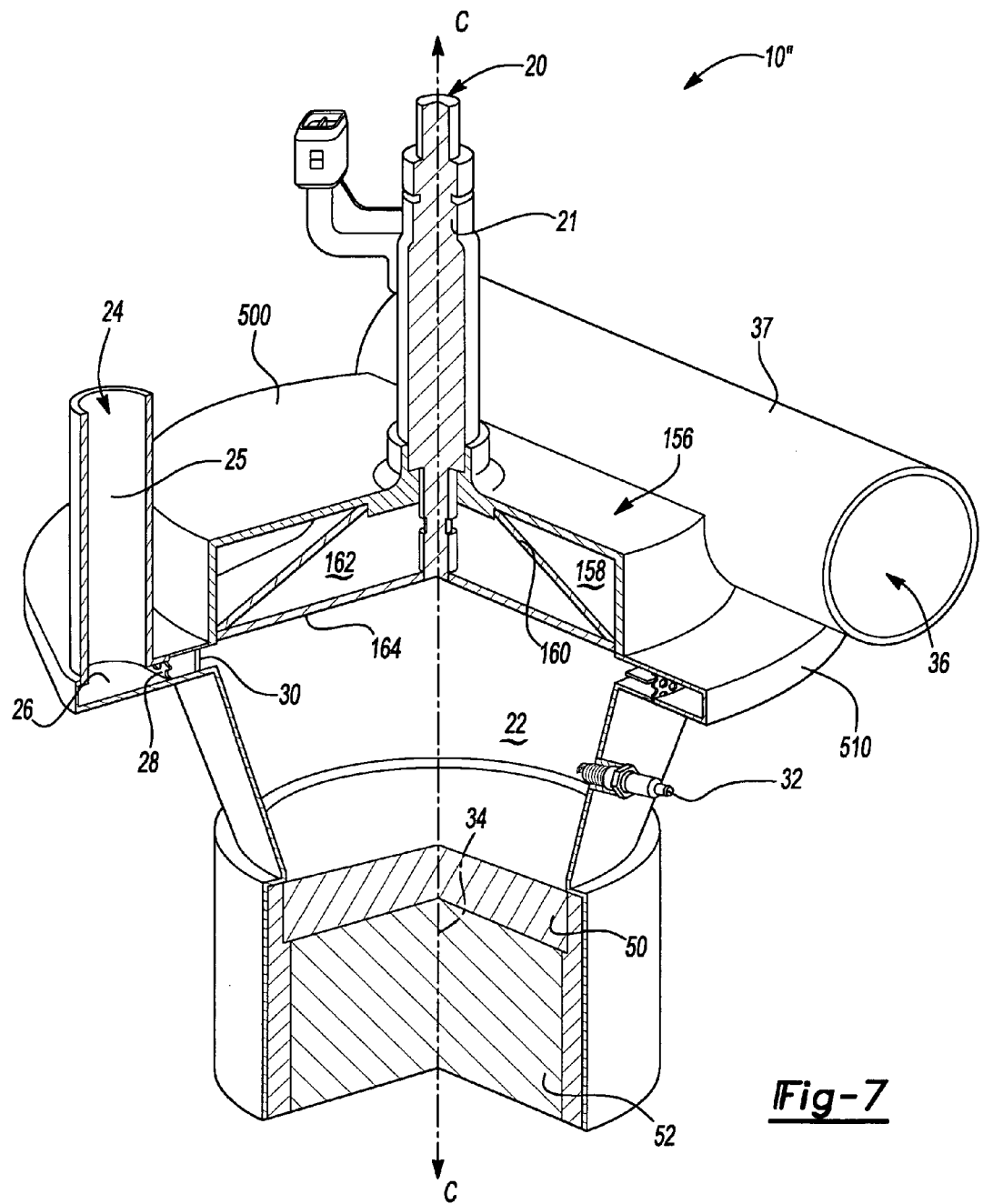
FIG. 7 is a sectional view of a multi-port inlet autothermal reformer according to a second alternative embodiment of the present invention.

An alternative embodiment of the autothermal reformer 10" is shown in FIG. 7, wherein common reference numbers are utilized herein. This third embodiment is based on the autothermal reformer 10 of the first embodiment, including the reforming section 14 and the inlet system 12, wherein inlet system 12 contains both the start up system 16 and the normal operation system 18 as shown in FIG. 1. The difference between this embodiment and the embodiment disclosed in FIG. 2 is the inlet system 12, specifically the normal operating system 18, which will described in detail below.

The third embodiment 10" includes a run air inlet 36 and a fuel inlet 20 all in fluid communication with the common volume 22 which make up the normal operation system 18 of the inlet system 12 of FIG. 1. The difference between this embodiment and the embodiment disclosed in FIGS. 1-3 is the features of the run air inlet 36.

Run air inlet 36 includes a port 37 defined in a housing 500 in fluid communication with a manifold 156 for receiving air and steam. Manifold 156 has two annular chambers, 158 and 162, defined within housing 500 and divided by a porous material 160 positioned diagonally across the manifold 156. Air from port 37 enters annular chamber 158 of manifold 156. Annular chamber 158 is in fluid communication with the porous material 160 through which air and steam flow. The porous material 160 could be, for example, a perforated plate or sintered metal, and acts to place a slight restriction on the flow in the manifold 156, to ensure uniform distribution.

Porous material 160 is in fluid communication with the annular chamber 162 and the air and steam enter annular chamber 162 after flowing through porous material 160. Annular chamber 162 is in further fluid communication with a porous material 164. Porous material 164 is defined in housing 500, and is in fluid communication with common volume 22. Porous material 164 could be, for example, a perforated plate or sintered metal, and acts to place slight restriction on the flow in annular chamber 162, to create the desired velocity profile for the steam and air before the mixture enters common volume 22. In addition, the use of two porous materials, 160 and 164, allows the flow to be distributed to the full inlet diameter of the common volume 22 without inducing flow disturbances or recirculation.

On vehicle start-up, air and fuel simultaneously enter the autothermal reformer 10 via inlet system 12. Air enters through port 25 into annular volume 26. The air then passes through porous material 28 before entering swirler 30. The air from swirler 30 flows into common volume 22. Fuel enters via fuel metering device 21 into common volume 22. Air and fuel are then ignited in common volume 22 by ignition source 32. Ignition source 32 could be a spark plug, glow plug, etc. Ignition source 32 is shown as a spark plug.

The heat generated from the combustion is used to warm the reforming section 14. Once thermocouple 34 detects that the reforming section 14 has reached its light-off temperature, normal operation ensues.

In normal operation mode, air and steam are diverted from start-up air inlet 24 to port 37. The air and steam mixture in port 37 flows into annular chamber 158 and then enters porous material 160. After passing through porous material 160, the air and steam mixture enters annular chamber 162. From annular chamber 162, the air and steam mixture flows through a second porous material 164 before entering common volume 22. Fuel enters common volume 22 via fuel metering device 21. The air, steam and fuel in common volume 22 mix before passing through the heat shield 50 into the first primary reactor 52.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An autothermal reformer for reforming a hydrocarbon fuel, comprising:
    a housing defining a reforming chamber;
    an ignition source disposed in said reforming chamber;
    a fuel inlet in communication with said reforming chamber;
    a steam inlet in communication with said reforming chamber; and
    a plurality of air inlets in fluid communication with said reforming chamber, one of said plurality of air inlets in fluid communication with said reforming chamber in a start-up mode to provide a volume of air and a second of said plurality of air inlets in fluid communication with said reforming chamber in a normal operation mode to provide a volume of air.

2. The autothermal reformer of claim 1 in which the air inlets feed into:
    first air chambers for said start-up mode which induce recirculation to stabilize thermal partial oxidation within a volume before a catalytic reforming zone;
    second air chamber(s) for said normal operation mode which add flow within said volume to offset velocity vectors and, eliminate or minimize recirculation; and
    third air chamber(s) for said normal operation mode which are separate from the first air chambers for start-up mode but use the same volume for vaporization and mixing as used for start-up thermal partial oxidation.

3. The autothermal reformer of claim 1 further comprising a valve for distributing said volume of air between said plurality of air inlets.

4. The autothermal reformer of claim 1 further comprising a primary reactor which comprises a volume for thermal partial oxidation and vaporization, mixing and distribution.

5. The autothermal reformer of claim 4 further comprising a temperature sensor disposed within said primary reactor.

6. The autothermal reformer of claim 4 further comprising a steam reformer disposed downstream of said volume for thermal partial oxidation.

7. The autothermal reformer of claim 1 further comprising a heat exchanger disposed within said reforming chamber.

8. The heat exchanger of claim 7 wherein one of said fuel, steam, and/or air inlets is in thermal communication with said heat exchanger.

9. An autothermal reformer for reforming a hydrocarbon fuel, comprising:
    a housing defining a reforming chamber;
    an ignition source disposed in said thermal reforming chamber;
    a plurality of air inlets in fluid communication with said reforming chamber, one of said plurality of air inlets in fluid communication with said reforming chamber in a start-up mode to provide a volume of air and another of said plurality of air inlets in fluid communication with said reforming chamber in a normal operation mode to provide a volume of air;
    a first fluid inlet in communication with said reforming chamber for providing hydrocarbon fuel to said reforming chamber for reforming the hydrocarbon fuel in a combustion process during said start-up mode;
    a second fluid inlet in communication with said reforming chamber providing hydrocarbon fuel and water to said reforming chamber for catalytically reforming the hydrocarbon fuel during said normal operation mode; and
    wherein said one of said plurality of air inlets feed into first air chambers for said start-up mode, and said first air chambers induce recirculation to stabilize thermal partial oxidation within a volume before a catalytic reforming zone.

10. The autothermal reformer of claim 9 further comprising a valve for distributing said volume of air between said plurality of air inlets.

11. The autothermal reformer of claim 9 wherein said reforming chamber further comprises a thermal reforming zone.

12. The autothermal reformer of claim 9 further comprising a temperature sensor disposed within said catalytic reforming zone.

13. The autothermal reformer of claim 9 further comprising a steam reformer disposed downstream of said catalytic reforming zone.

14. The autothermal reformer of claim 9 further comprising a heat exchanger disposed within said reforming chamber.

15. An autothermal reformer for reforming a hydrocarbon fuel, comprising:
- a housing defining a reforming chamber including a thermal reforming portion and a catalytic reforming portion;
- a fuel inlet in communication with said thermal reforming portion;
- a start-up air inlet in communication with said thermal reforming portion, said air inlet including an annular volume in communication with a first annular ring of porous material and including a first swirler disposed radially inward from said first ring of porous material;
- a run air inlet in communication with said thermal reforming portion, said run air inlet including an inlet port in communication with a second swirler; and
- a steam inlet in communication with said thermal reforming portion, said steam inlet including an annular volume in communication with a second annular ring of porous material and including a third swirler disposed radially inward from said second ring of porous material.

16. An autothermal reformer for reforming a hydrocarbon fuel, comprising:
- a housing defining a reforming chamber including a thermal reforming portion and a catalytic reforming portion;
- a fuel inlet in communication with said thermal reforming portion;
- a start-up air inlet in communication with said thermal reforming portion, said air inlet including an annular volume in communication with an annular ring of porous material and including a swirler disposed radially inward from said ring of porous material; and
- a run air/steam inlet in communication with said thermal reforming portion, said run air/steam inlet including an inlet port in communication with a porous material through which said run air/steam inlet communicates with said thermal reforming portion.

17. An autothermal reformer for reforming a hydrocarbon fuel, comprising:
- a housing defining a reforming chamber including a thermal reforming portion and a catalytic reforming portion;
- a fuel inlet in communication with said thermal reforming portion;
- a pair of start-up air inlets in communication with said thermal reforming portion, said start-up air inlets each including an annular volume in communication with an annular ring of porous material and each including a swirler disposed radially inward from said porous material;
- a run air inlet in communication with said thermal reforming portion, said run air inlet including an inlet port in communication with a swirler; and
- a pair of run fuel/steam inlets in communication with said thermal reforming portion, said run fuel/steam inlets each including an annular volume in communication with an annular ring of porous material and each including a swirler disposed radially inward from said porous material.

* * * * *